(12) United States Patent
McGill (10) Patent No.: US 8,347,702 B2
(45) Date of Patent: Jan. 8, 2013

(54) TRACKED VEHICLE TRACK BACKER PAD AND ROAD WHEEL TIRE TEST MACHINE AND METHOD

(75) Inventor: Kenneth A. McGill, Norwalk, OH (US)

(73) Assignee: The Pullman Company, Milan, OH (US)

( * ) Notice: Subject to any disclaimer, the term of this patent is extended or adjusted under 35 U.S.C. 154(b) by 358 days.

(21) Appl. No.: 12/849,915

(22) Filed: Aug. 4, 2010

(65) Prior Publication Data

US 2012/0031163 A1 Feb. 9, 2012

(51) Int. Cl.
*G01M 17/03* (2006.01)

(52) U.S. Cl. ............... 73/116.01; 73/117.01; 73/118.01

(58) Field of Classification Search .............. 73/116.01, 73/117.01, 117.02, 117.03, 118.01, 121
See application file for complete search history.

(56) References Cited

U.S. PATENT DOCUMENTS

| | | | | |
|---|---|---|---|---|
| 3,977,243 A | * | 8/1976 | Yamada et al. | 73/146 |
| 3,987,672 A | * | 10/1976 | Loyer | 73/146 |
| 4,238,954 A | * | 12/1980 | Langer | 73/146 |
| 4,324,128 A | * | 4/1982 | Langer | 73/8 |
| 4,344,324 A | * | 8/1982 | Langer | 73/146 |
| 5,323,646 A | * | 6/1994 | Poling, Sr. | 73/146 |
| 5,448,910 A | * | 9/1995 | Yurjevich et al. | 73/146 |
| 5,979,231 A | * | 11/1999 | Lees et al. | 73/146 |
| 6,016,695 A | * | 1/2000 | Reynolds et al. | 73/146 |
| 6,584,835 B2 | * | 7/2003 | Jenniges et al. | 73/146 |
| 7,137,675 B1 | | 11/2006 | Simula et al. | |
| 7,703,863 B2 | | 4/2010 | Koolhiran | |
| 7,731,306 B2 | | 6/2010 | Busley et al. | |
| 8,205,494 B2 | * | 6/2012 | Nicolini | 73/462 |
| 2009/0095064 A1 | * | 4/2009 | Imanishi et al. | 73/118.01 |
| 2009/0301183 A1 | * | 12/2009 | Jenniges et al. | 73/146 |
| 2010/0031740 A1 | * | 2/2010 | Olex et al. | 73/146 |
| 2010/0107757 A1 | * | 5/2010 | Nicolini | 73/462 |

* cited by examiner

*Primary Examiner* — Eric S McCall
(74) *Attorney, Agent, or Firm* — Harness, Dickey & Pierce, P.L.C.

(57) ABSTRACT

A testing machine tests the durability of backer pads on the track shoe assembly and the surface of the road wheel. The test machine utilizes two eccentric drives to move a section of a road wheel to simulate actual vehicle conditions. A positioning system positions the track shoe assembly with respect to the road wheel to adjust the loading between the two components.

17 Claims, 7 Drawing Sheets

TRACKED VEHICLE TRACK BACKER PAD AND ROAD WHEEL TIRE TEST MACHINE AND METHOD

FIELD

The present disclosure relates to tracked vehicle track backer pads and road wheel tires. More particularly, the present disclosure relates to a test machine and method for testing the track backer pads and the road wheel tires.

BACKGROUND

This section provides background information related to the present disclosure which is not necessarily prior art.

Track backer pads and road wheel tires for tracked vehicles are currently fatigue tested primarily on the tracked vehicle itself. The tracked vehicle is equipped with the specified track backer pads and/or road wheel tires and the tracked vehicle is then driven through a representative fatigue course for a specified number of miles or a specified number of cycles through the representative fatigue course.

Testing these components using the actual vehicle requires producing an entire track of track pitches which is very expensive and time consuming for experimental components. Once fitted on the actual vehicle, the test vehicle has to be driven around the representative fatigue course causing additional expense. While the actual use of a test vehicle is a realistic test, the testing is subjective and not repeatable because the actual vehicle test can be affected by the weather, the representative fatigue course deterioration, the driver and the other components on the tracked vehicle.

Some shortened tracks are tested by being run on track-dynamometers but the use of a track dynamometer requires most of the track to be constructed and then requires a significant amount of energy to operate the track dynamometer. Some simplistic fatigue tests are run on individual components using hydraulic test machines but these simplistic tests do not apply representative stresses and strains to test the specimen in the loading characteristics the specimen would receive when in an actual vehicle.

SUMMARY

This section provides a general summary of the disclosure, and is not a comprehensive disclosure of its full scope or all of its features.

The present disclosure provides a test machine and a testing method which economically tests the elastomer on a single track backer pad and/or on a single road wheel using stresses and strains which simulate actual vehicle stresses and strains. The test machine and test method will allow the materials for the backer pad and/or the road wheel to be tested one piece at a time in a testing lab using representative stresses and strains. This testing will be more responsive, less expensive and more repeatable than the testing that is currently being performed using actual tracked vehicles.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
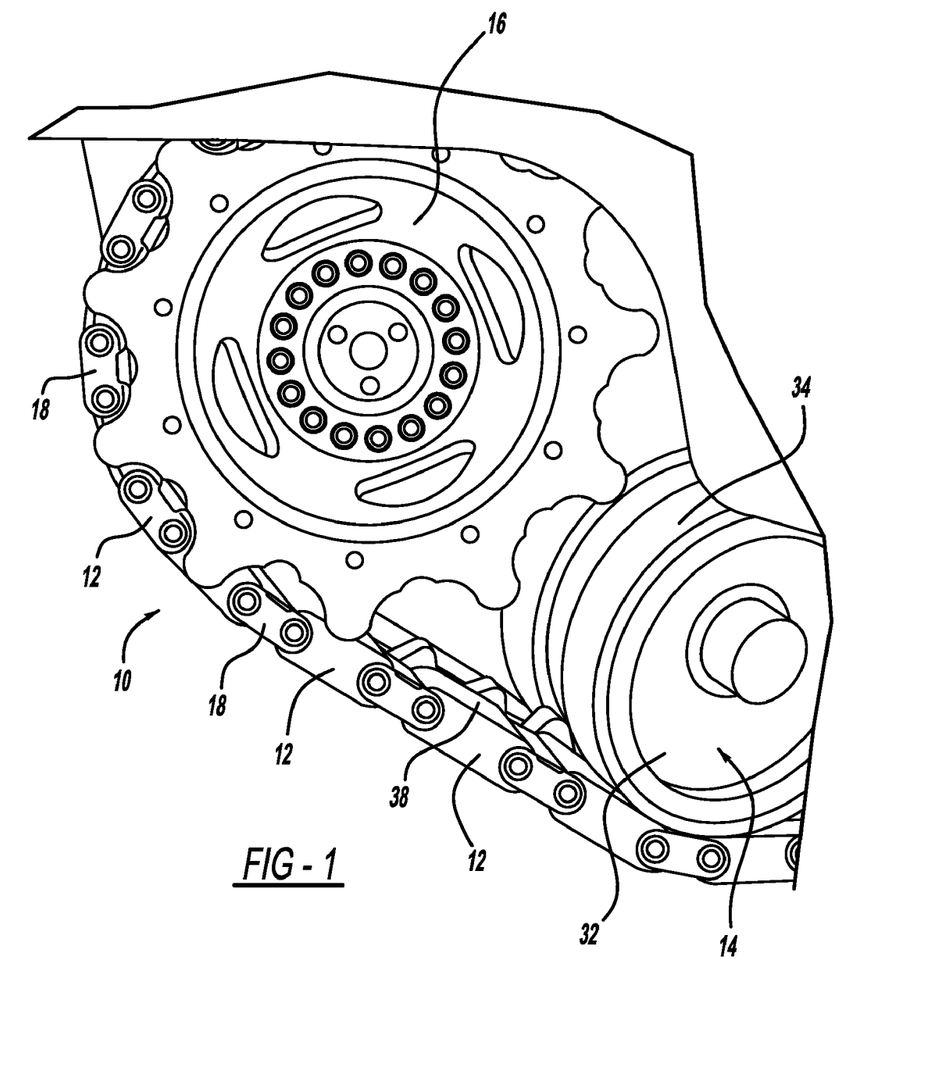
FIG. 1 is a perspective schematic view of a crawler track having track backer pads and road wheels.

There is illustrated in FIG. 1, a perspective of a crawler track which is represented generally by reference numeral 10. Crawler track 10 comprises a plurality of track shoe assemblies 12, a plurality of road wheel assemblies 14 (only one shown) and a pair of spoked wheels 16 (only one shown) as is known in the art. Typically one of the spoked wheels 16 is driven which in turn drives a chain link 18 which is attached to the plurality of track shoe assemblies 12.

Figure 2:
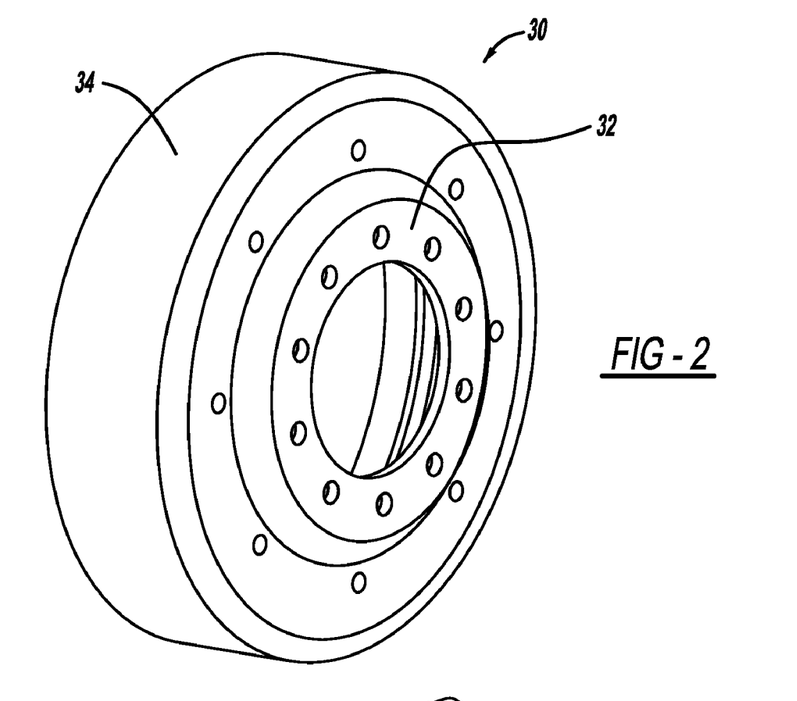
FIG. 2 is a perspective view of a road wheel illustrated in FIG. 1.

Referring to FIG. 2, a road wheel 30 is illustrated. Road wheel assembly 14 typically includes a pair of road wheels 30, one of which is illustrated in FIG. 2. Each road wheel 30 includes a central wheel 32 which has its outer circumference covered by an annular elastomeric member 34.

Figure 3:
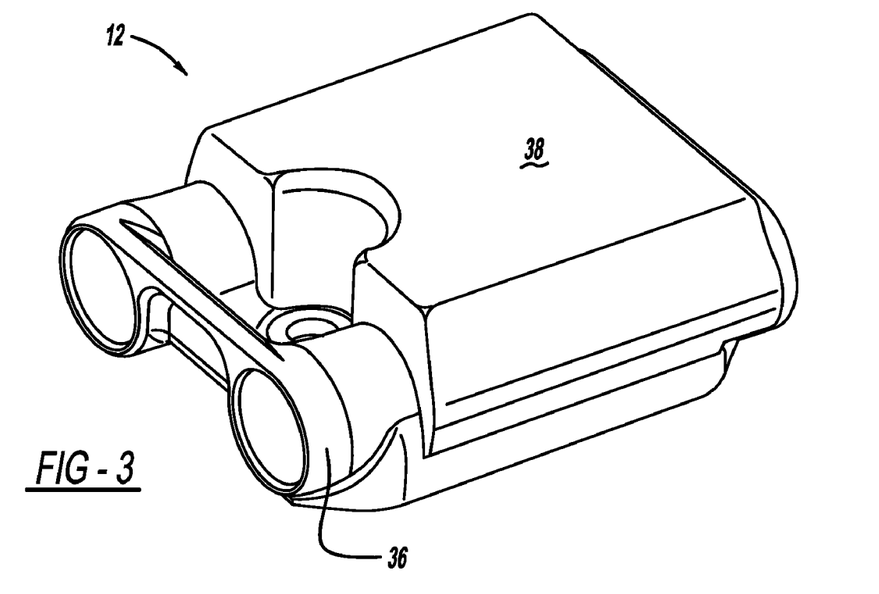
FIG. 3 is a perspective view of a track shoe including the track backer pads illustrated in FIG. 1.

Referring to FIG. 3, one of track shoe assemblies 12 is illustrated. Track shoe assembly 12 typically includes a track shoe 36 which is adapted to be secured to chain link 18 and a detachable elastomeric wear pad 38 which is attached to one side of track shoe 36.

Both annular elastomeric member 34 and elastomeric wear pad 38 exhibit wear during the operation of crawler track 10 and new elastomeric materials for elastomeric member 34 and elastomeric wear pad 38 are being developed. FIGS. 4-7E illustrate a testing machine 40 which is designed to test the durability of elastomeric member 34 and elastomeric wear pad 38 in a laboratory setting.

Figure 4:
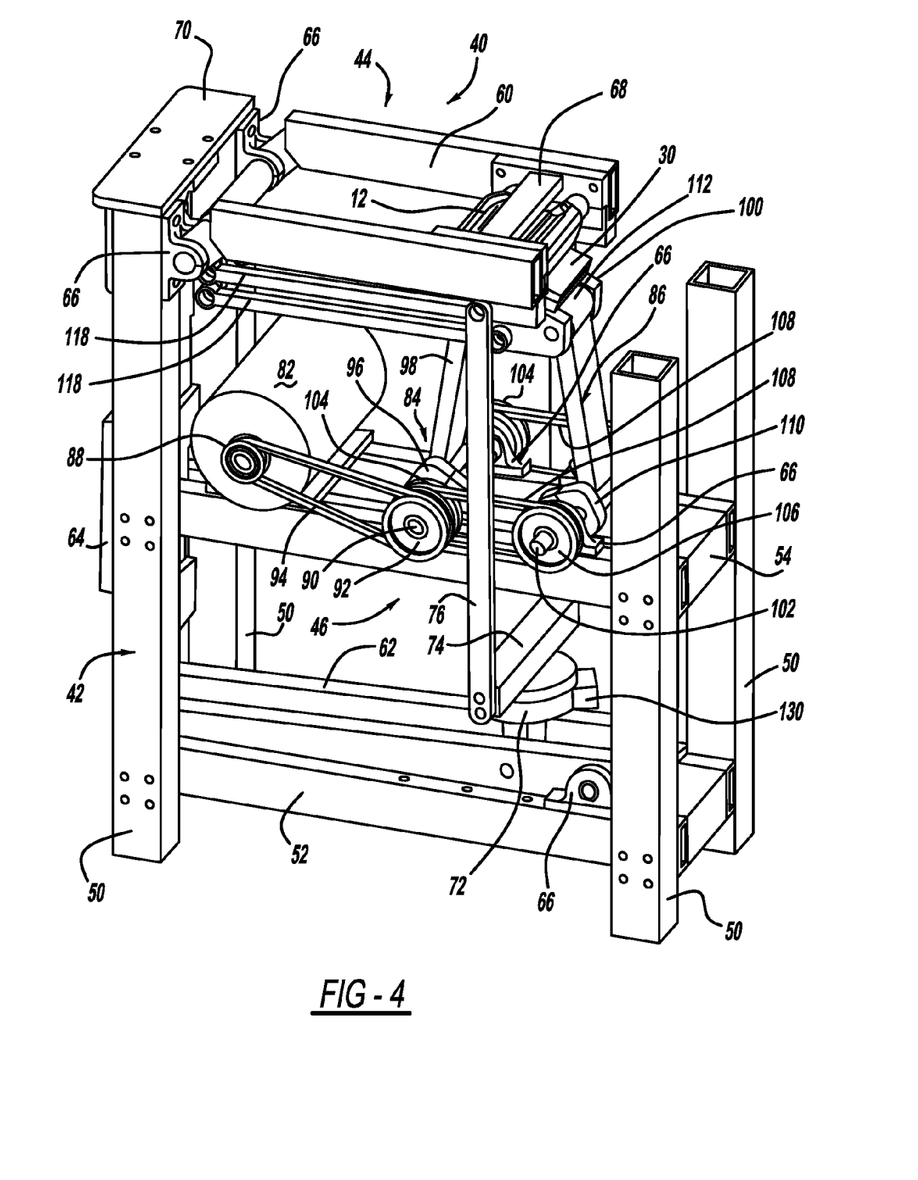
FIG. 4 is a perspective view of a testing machine in accordance with the present disclosure.
Figure 5:
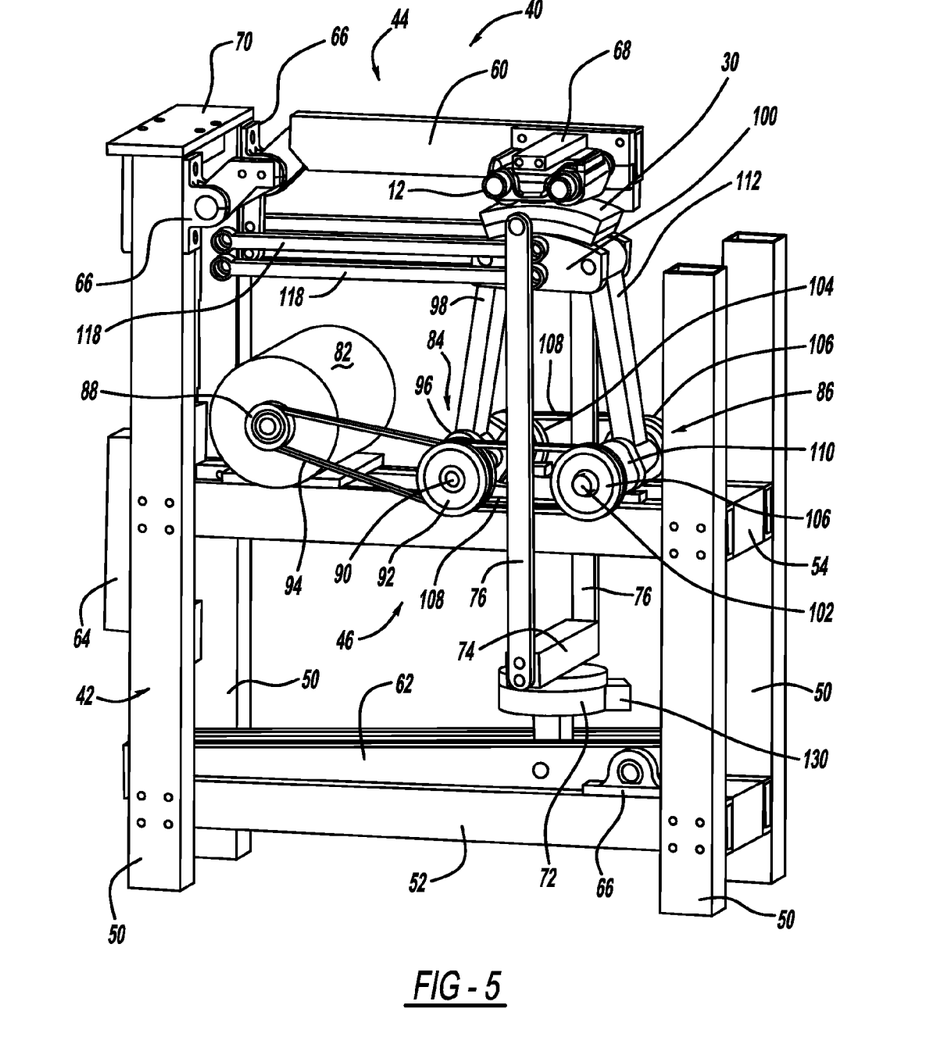
FIG. 5 is a perspective view similar to FIG. 4 but with some components removed.
Figure 6:
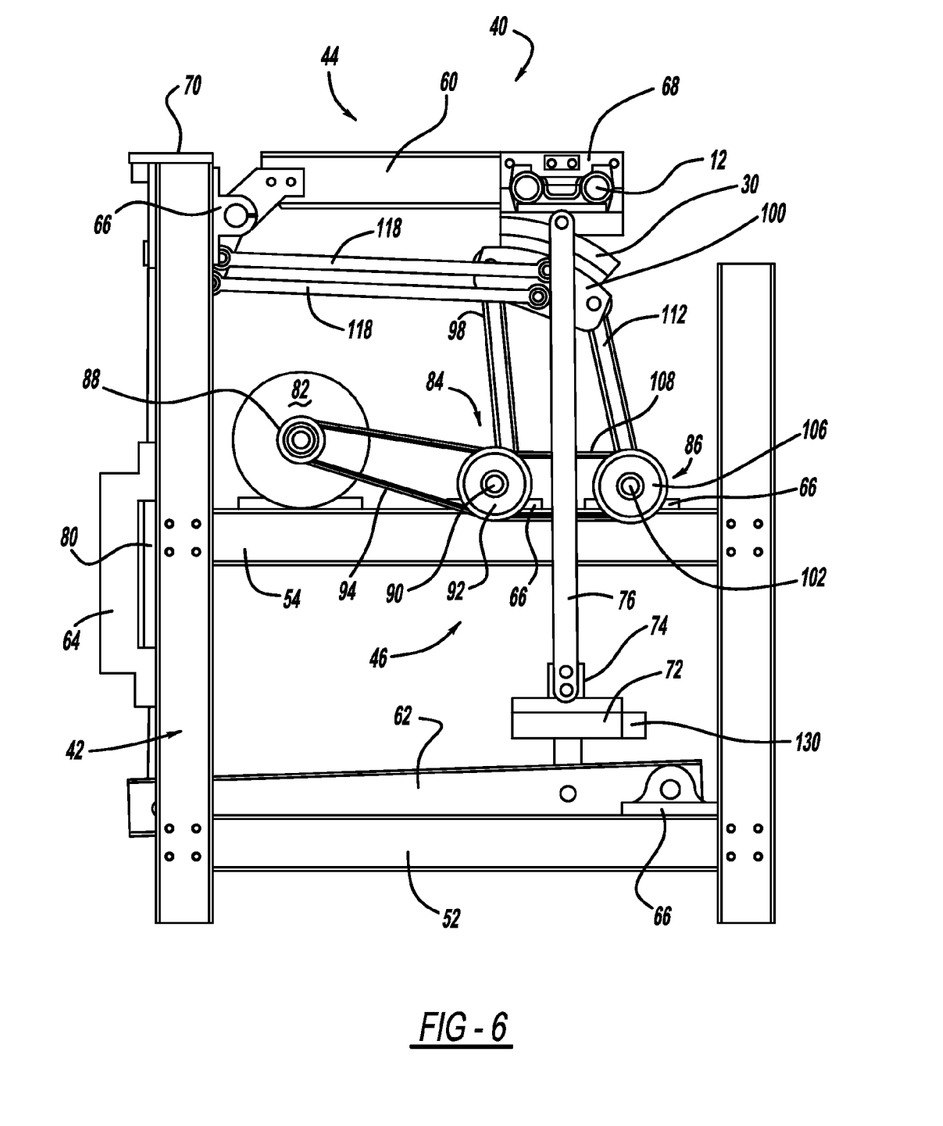
FIG. 6 is a side view of the testing machine illustrated in FIG. 5.

Testing machine 40 comprises a support frame 42, a positioning system 44 for track shoe assembly 12 and a drive system 46 for driving road wheel 30. Support frame 42 is a generally box-like structure which includes a plurality of upright legs 50, a lower support structure 52 and a middle support structure 54. Both lower support structure 52 and middle support structure 54 are secured to the plurality of upright legs 50 as is illustrated in FIGS. 4-6 with lower support structure 52 being located near the lower end of the plurality of legs 50 and middle support structure 54 being located near the middle portion of the plurality of legs 50. The attachment of lower support structure 52 and middle support structure 54 to the plurality of legs 50 create the box-like structure for testing machine 40.

Positioning system 44 includes a track shoe locating frame 60, a track shoe positioning frame 62 and a positioning mechanism 64. Track shoe locating frame 60 is rotatably secured at one end to two of the plurality of upright legs 50 using a pair of bearing blocks 66. An attachment structure 68 is attached to the opposite end of track shoe locating frame 60. Attachment structure 68 is adapted to receive and support the track shoe assembly 12 being tested. One or more support plates 70 are attached to the pair of upright legs 50 to which track shoe locating frame 60 is attached as illustrated in FIGS. 4-6.

Track shoe positioning frame 62 is rotatably secured to lower support structure 52 using a pair of bearing blocks 66. A positioning pad 72 is attached to track shoe positioning frame at a position spaced from bearing blocks 66 in a direction towards the end of track shoe positioning frame 62 opposite to the end of track shoe positioning frame to which bearing blocks 66 are attached. Positioning pad 72 is attached to track shoe locating frame 60 through a generally horizontal beam 74 and a pair of vertical arms 76. Pivotal movement of track shoe positioning frame 62 causes pivotal movement of track shoe locating frame 60 due to the attachment of positioning pad 72, the attachment of beam 74 and the attachment of vertical arms 76.

Positioning mechanism 64 includes a hydraulic cylinder 80 which is attached to the end of track shoe positioning frame 62 opposite to the end attached to bearing blocks 66 and to one or more of support plates 70. The stroking movement of hydraulic cylinder 80 causes pivotal movement of track shoe positioning frame 62 which in turn causes pivotal movement of track shoe locating frame 60 as described above. The pivotal movement of track shoe positioning frame 62 moves track shoe assembly 12 with respect to drive system 46 to control contact and loading between track shoe assembly 12 and road wheel 30 as discussed below.

Drive system 46 comprises a power source 82, a first mechanical eccentric drive 84 and a second mechanical eccentric drive 86. Power source 82 is an electric motor which is attached to middle support structure 54 and drives first and second mechanical drives 82 and 84 through a drive belt and pulley system. A drive pulley 88 is attached to the drive shaft of power source 82.

First mechanical eccentric drive 84 comprises a drive shaft 90 rotatably attached to middle support structure 54 using a pair of bearing blocks 66. Drive shaft 90 is driven by drive motor 82 through drive pulley 88 and a driven pulley 92 attached to drive shaft 90 using a toothed drive belt 94. An eccentric 96 is part of drive shaft 90 and rotates with drive shaft 90. A first driving arm 98 is rotatably attached at one end to eccentric 96 and at the opposite end to a road wheel support 100.

Second mechanical eccentric drive 86 comprises a drive shaft 102 rotatably attached to middle support structure 54 using a pair of bearing blocks 66. Drive shaft 102 is driven by power source 82 through a pair of drive pulleys 104 attached to drive shaft 90 and a pair of driven pulleys 106 attached to drive shaft 102 using a pair of synchronized toothed drive belts 108. The pair of synchronized toothed drive bolts 108 maintain and control the timing between the rotation of the first and second mechanical eccentric drives 84, 86. An eccentric 110 is part of drive shaft 102 and rotates with drive shaft 102. A second driving arm 112 is rotatably attached at one end to eccentric 110 and to the opposite end to road wheel support 100.

Road wheel support 100 is supported by first and second driving arms 98 and 112 and road wheel support 100 is also attached to track shoe locating frame 60 using a pair of linkage arms 118. Linkage arms 118 are pivotably attached to road wheel support 100 and pivotably attached to track shoe locating frame 60. As illustrated in FIGS. 4-6, a section of road wheel 30 which is to be tested is secured to road wheel support 100.

Figure 7A:
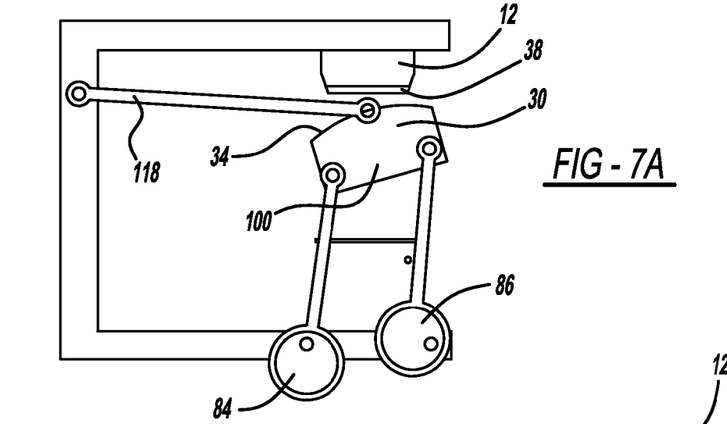
FIGS. 7A-7E is a schematic view illustrating the operation of the testing machine illustrated in FIG. 4.
Figure 7B:
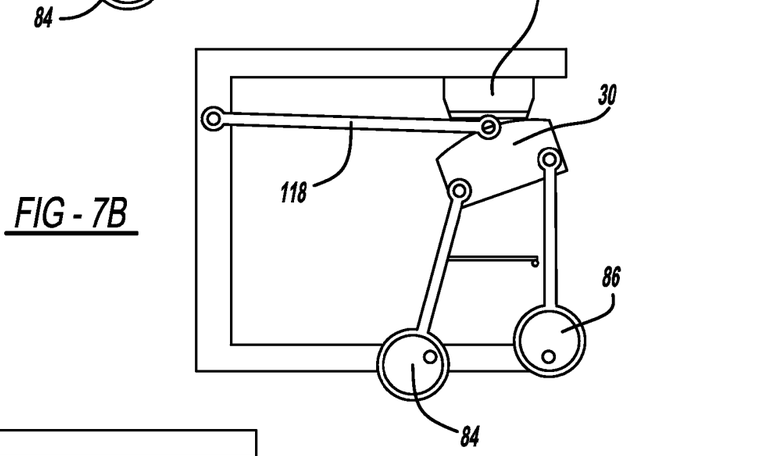
Figure 7C:
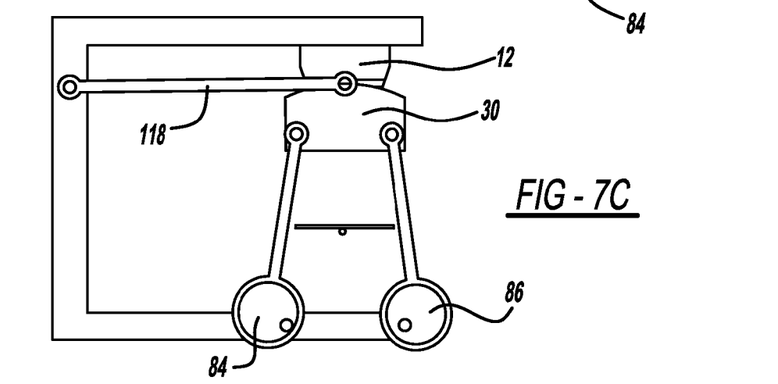
Figure 7D:
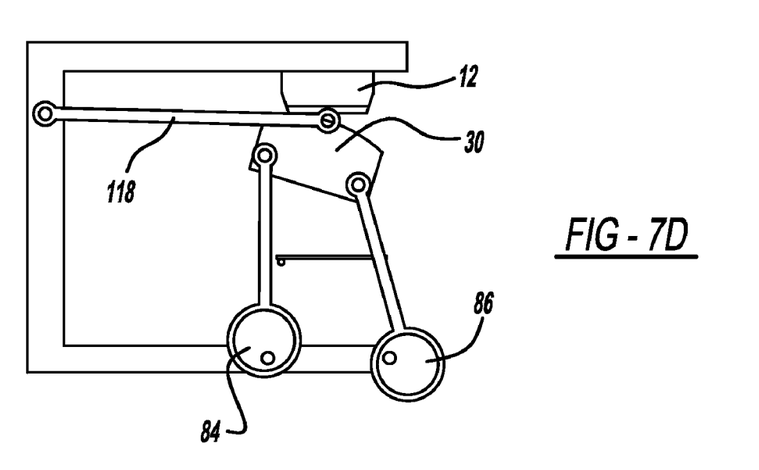
Figure 7E:
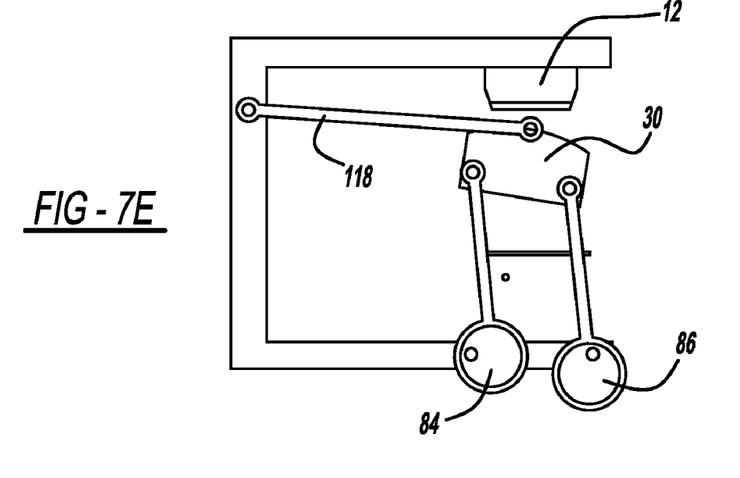

The operation of testing machine 40 is illustrated in FIGS. 7A-7E. First a track shoe assembly 12 including elastomeric wear pad 38 to be tested is secured to attachment structure 68 which is attached to track shoe locating frame 60. A section of a road wheel 30 including a section of annular elastomeric member 34 to be tested is secured to road wheel support 100. Hydraulic cylinder 80 is then actuated to position track shoe locating frame 60 and thus track shoe assembly 12 in the proper location in relation to the section of road wheel 30 for testing. Power source 82 powered to rotate both first and second mechanical eccentric drives 84 and 86. The rotation of drive shafts 90 and 102 causes the relative movement of the section of road wheel 30 in relation to the track shoe assembly illustrated in FIGS. 7A-7E. FIG. 7A illustrates the start of a test cycle where the section of road wheel 30 is spaced from track shoe assembly 12. Rotation of drive shafts 90 and 102 cause the initial contact of the section of road wheel 30 and track shoe assembly 12 as illustrated in FIG. 7B. Continued rotation of drive shafts 90 and 102 causes the section of road wheel 30 to roll across track shoe assembly 12 as illustrated in FIGS. 7C to 7D. Continued rotation of drive shafts 90 and 102 causes the section of road wheel 30 to separate from track shoe assembly 12 as illustrated in FIG. 7E. Continued rotation of drive shafts 90 and 102 moves the section of road wheel 30 from the position illustrated in FIG. 7E to the position illustrated in FIG. 7A and the process repeats itself. The relative rotation between first and second mechanical eccentric drives 84 and 86 controlled by the pair of synchronized toothed drive belts 108 control the motion of the section of road wheel 30 in relation to track shoe assembly 12 such that the section of road wheel 30 moves in a predetermined rolling manner with respect to track shoe assembly 12.

This testing machine and process simulates the actual engagement between road wheel 30 and track shoe assembly 12 during movement of crawler track 10. A load cell 130 attached to positioning pad 72 to monitor and adjust the loading between the section of road wheel 30 and track shoe assembly 12. The load and contact between the section of the road wheel 30 and track shoe assembly 12 are adjusted by using hydraulic cylinder 80 which pivots track shoe positioning frame 62 to position track shoe assembly 12 with respect to the section of road wheel 30. A controller (not shown) can continuously monitor the loading using load cell 130 and can make the necessary adjustments to the load in real time using hydraulic cylinder 80.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A test machine comprising:
a support frame;
a positioning system attached to said support frame, said positioning system positioning a first test piece with respect to said support frame;
a drive system attached to said support frame, said drive system positioning a second test piece with respect to said support frame; wherein
said drive system moves with respect to said support frame to cause said second test piece to move in a predetermined manner with respect to said first test piece; and said positioning system moves said first test piece with respect to said second test piece to control contact and loading between said first and second test pieces.

2. The test machine according to claim 1, wherein the positioning system comprises a locating frame pivotably attached to said support frame and an attachment structure secured to said locating frame, said attachment structure being adapted to attach said first test piece to said locating frame.

3. The test machine according to claim 2, wherein the positioning system further comprises a positioning frame pivotably attached to said support frame and an arm extending between said locating frame and said positioning frame.

4. The test machine according to claim 3, wherein the positioning system further comprises a positioning mechanism disposed between said support frame and said positioning frame, said positioning mechanism pivoting said positioning frame with respect to said supporting frame.

5. The test machine according to claim 4, wherein said pivoting of said positioning frame with respect to said support frame causes pivoting of said locating frame with respect to said support frame.

6. The test machine according to claim 4, wherein said positioning mechanism includes a hydraulic cylinder.

7. The test machine according to claim 1, wherein said drive system comprises a power source and a first eccentric drive powered by said power source.

8. The test machine according to claim 7, wherein said drive system further comprises a second eccentric drive powered by said driving source.

9. The test machine according to claim 8, wherein said drive system further comprises means for synchronizing the movement of said first eccentric drive with the movement of said second eccentric drive.

10. The test machine according to claim 9, wherein said synchronizing means comprises a timing belt.

11. The test machine according to claim 9, wherein said drive system further comprises a first driving arm, a second driving arm and a support, said first driving arm extending between said first eccentric drive and said support, said second driving arm extending between said second eccentric drive and said support.

12. The test machine according to claim 11, wherein said drive system further comprises a linkage arm extending between said support frame and said support.

13. The test machine according to claim 11, wherein said drive system further comprises a linkage arm extending between said locating frame and said support.

14. The test machine according to claim 11, wherein the positioning system comprises a locating frame pivotably attached to said support frame and an attachment structure secured to said locating frame, said attachment structure being adapted to attach said first test piece to said locating frame.

15. The test machine according to claim 14, wherein the positioning system further comprises a positioning frame pivotably attached to said support frame and an arm extending between said locating frame and said positioning frame.

16. The test machine according to claim 15, wherein the positioning system further comprises a positioning mechanism disposed between said support frame and said positioning frame, said positioning mechanism pivoting said positioning frame with respect to said supporting frame.

17. The test machine according to claim 16, wherein said pivoting of said positioning frame with respect to said support frame causes pivoting of said locating frame with respect to said support frame.

* * * * *